US012620308B2

(12) United States Patent
Gyllenhammar et al.

(10) Patent No.: US 12,620,308 B2
(45) Date of Patent: May 5, 2026

(54) AUGMENTED PATH PLANNING FOR AUTOMOTIVE APPLICATIONS

(71) Applicant: ZENUITY AB, Gothenburg (SE)

(72) Inventors: Magnus Gyllenhammar, Pixbo (SE); Carl Zandén, Lindome (SE); Majid Khorsand Vakilzadeh, Mölndal (SE)

(73) Assignee: ZENUITY AB, Gothenburg (SE)

( * ) Notice: Subject to any disclaimer, the term of this patent is extended or adjusted under 35 U.S.C. 154(b) by 148 days.

(21) Appl. No.: 18/254,423

(22) PCT Filed: Nov. 26, 2020

(86) PCT No.: PCT/EP2020/083535
§ 371 (c)(1),
(2) Date: May 25, 2023

(87) PCT Pub. No.: WO2022/111809
PCT Pub. Date: Jun. 2, 2022

(65) Prior Publication Data
US 2024/0046790 A1     Feb. 8, 2024

(51) Int. Cl.
*G08G 1/0968* (2006.01)
*B60W 60/00* (2020.01)
*G06V 20/56* (2022.01)

(52) U.S. Cl.
CPC ..... *G08G 1/096811* (2013.01); *B60W 60/001* (2020.02); *B60W 2556/35* (2020.02); *B60W 2556/45* (2020.02); *G06V 20/56* (2022.01)

(58) Field of Classification Search
CPC .......... G08G 1/096811; B60W 60/001; B60W 2556/45; B60W 2556/35; G06V 20/56
See application file for complete search history.

(56) References Cited

U.S. PATENT DOCUMENTS 9,612,123 B1    4/2017  Levinson et al.
10,106,153 B1   10/2018 Xiao et al.
(Continued)

FOREIGN PATENT DOCUMENTS

CN    110271556 A    9/2019
CN    110850854 A    2/2020
(Continued)

OTHER PUBLICATIONS

International Search Report and Written Opinion mailed Jul. 9, 2021 for International Application No. PCT/EP2020/083535, 15 pages.
(Continued)

*Primary Examiner* — Jay Khandpur
(74) *Attorney, Agent, or Firm* — Sage Patent Group

(57) ABSTRACT

The present disclosure relates to a method for augmenting capabilities of an Automated Driving System (ADS) of a vehicle. The method includes locally processing, by means of a perception module of the ADS, sensor data obtained from one or more sensors of the vehicle in order to generate a local world-view of the ADS. The sensor data is associated with a time period and includes information about a surrounding environment of the vehicle during the time period. The method further includes generating a local candidate path to be executed by the ADS based on the generated local world-view of the ADS, and transmitting a first set of data to a remote system. The first set of data is associated with the time period and including information about the surrounding environment of the vehicle during the time period.

15 Claims, 6 Drawing Sheets

(56) References Cited

U.S. PATENT DOCUMENTS

| | | | |
|---|---|---|---|
| 10,457,294 B1 | 10/2019 | Zhang et al. | |
| 2011/0170416 A1* | 7/2011 | Schwager | H04L 45/00 |
| | | | 370/238 |
| 2018/0348784 A1 | 12/2018 | Zheng et al. | |
| 2019/0286151 A1 | 9/2019 | Palanisamy et al. | |
| 2019/0291728 A1* | 9/2019 | Shalev-Shwartz | |
| | | | B60W 30/0953 |
| 2019/0392268 A1* | 12/2019 | Tariq | G06V 20/56 |
| 2020/0064846 A1 | 2/2020 | Chen et al. | |
| 2020/0209887 A1 | 7/2020 | Yu et al. | |
| 2021/0116256 A1* | 4/2021 | Konrardy | G06Q 50/265 |
| 2021/0133466 A1* | 5/2021 | Gier | G05D 1/0223 |
| 2021/0163021 A1* | 6/2021 | Frazzoli | H04W 4/48 |
| 2022/0119012 A1* | 4/2022 | Agon | G06V 20/56 |
| 2022/0126864 A1* | 4/2022 | Moustafa | B60W 60/0011 |

FOREIGN PATENT DOCUMENTS

| | | | | |
|---|---|---|---|---|
| CN | 111830959 A | | 10/2020 | |
| CN | 114971018 A | * | 8/2022 | G08G 1/0125 |
| CN | 116802698 A | | 9/2023 | |
| EP | 3730373 A1 | | 10/2020 | |

OTHER PUBLICATIONS

Office Action mailed May 31, 2025 for Chinese Patent Application No. 202080108359.4, 12 pages.
Office Action, European Patent Application No. 20816916.9, mailed Mar. 17, 2026, 5 pages.

* cited by examiner

AUGMENTED PATH PLANNING FOR AUTOMOTIVE APPLICATIONS

CROSS-REFERENCE TO RELATED APPLICATIONS

This application is a 35 U.S.C § 371 national stage application for International Application No. PCT/EP2020/083535, entitled "AUGMENTED PATH PLANNING FOR AUTOMOTIVE APPLICATIONS", filed on Nov. 26, 2020, the disclosures and contents of which are hereby incorporated by reference in their entireties.

TECHNICAL FIELD

The present invention relates to Automated Driving Systems (ADSs) of automotive vehicles. More specifically, the present invention relates to methods and systems for augmenting capabilities of an Automated Driving System (ADS) of a vehicle.

BACKGROUND

During the last few years, the research and development activities related to autonomous vehicles has exploded in number and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUS), upon which advanced control systems may interpret sensory information to identify appropriate navigation paths, as well as obstacles, free-space areas, and/or relevant signage.

A problem within the field of automated driving systems is the growing need of processing capability to construct a sufficiently rich representation of the surrounding environment of the vehicle and then plan accordingly. More specifically, the limitation invoked by the available hardware and power resources onboard the vehicle imposes direct limitations on (1) the amount of input data (e.g. raw sensor data) that can effectively be utilized, and (2) on the level of sophistication of the algorithms (including neural networks)

responsible for the perception output as well as path planning. This in turn limits the number of extensions or new functionality that can be added to an existing platform which is already at its capability limit.

There is accordingly a need in the art for new solutions for handling the growing amount of available data for building better awareness of the vehicle's surroundings and for improving the automated quality and precautionary decisions. As always, the improvement in performance and extension of functionality shall preferably be made without significant impact on the size, power consumption and cost of the on-board system or platform.

SUMMARY

It is therefore an object of the present invention to provide a method for augmenting capabilities of an ADS of a vehicle, a computer-readable storage medium, a corresponding in-vehicle system, and a vehicle comprising such a system which alleviates all or at least some of the drawbacks associated with currently known systems.

In particular, it is an object of the present invention to provide a solution for handling the growing amount of available data for improving the automated quality and precautionary decisions of the ADS with minimal impact on size, power consumption and cost of the on-board system or platform.

These and other objects are achieved by means of a method for augmenting capabilities of an ADS of a vehicle, a computer-readable storage medium, a corresponding in-vehicle system, and a vehicle comprising such a system as defined in the appended claims. The term exemplary is in the present context to be understood as serving as an instance, example or illustration.

According a first aspect of the present invention, there is provided a method for augmenting capabilities of an Automated Driving System (ADS) of a vehicle. The method comprises locally processing, by means of a perception module of the ADS, sensor data obtained from one or more sensors of the vehicle in order to generate a local world-view of the ADS. The sensor data is associated with a time period and comprises information about a surrounding environment of the vehicle during the time period. The method further comprises generating a local candidate path to be executed by the ADS based on the generated local world-view of the ADS, and transmitting a first set of data to a remote system. The first set of data is associated with the time period and comprising information about the surrounding environment of the vehicle during the time period. Furthermore, the method comprises receiving off-board processed data from the remote system, where the off-board processed data is indicative of a supplementary candidate path to be executed by the ADS. Moreover, the method comprises selecting a path, from the local candidate path and the supplementary candidate path based on at least one constraint, for execution by the ADS, and generating, at an output, a signal indicative of the selected path for execution.

Accordingly, the present inventors realized that in order to control the ADS in a safe way it is in the majority of cases sufficient to obtain this output from the perception system within the order of hundreds of milliseconds or even seconds (as most of safety is done through precautionary algorithms, and not quick emergency actions). This acceptable delay opens up for the opportunity to conduct some (rather large parts) of the processing (for both real-time perception and decision & control, as well as supervision of these) in a cloud service/system. Moving to cloud processing for real-time control has several technical advantages related to the increased flexibility achieved when the algorithms and models used are decoupled from the on-board platform.

Further, according to a second aspect of the present invention, there is provided a (non-transitory) computer-readable storage medium storing one or more programs configured to be executed by one or more processors of a vehicle control system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, according to another aspect of the present invention, there is provided an in-vehicle system for augmenting capabilities of an ADS of a vehicle. The in-vehicle system comprises control circuitry configured to locally process, by means of a perception module, sensor data obtained from one or more sensors of the vehicle in order to generate a local world-view of the ADS. The sensor data is associated with a time period and comprises information about a surrounding environment of the vehicle during the time period. Furthermore, the control circuitry is configured to generate a local candidate path to be executed by the ADS based on the generated local world-view of the ADS, and to transmit a first set of data comprising information about the surrounding environment of the vehicle to a remote system. The first set of data is associated with the time period and comprising information about the surrounding environment of the vehicle during the time period. Furthermore, the control circuitry is configured to obtain off-board processed data from the remote system. The off-board processed data is indicative of a supplementary candidate path suitable to be executed by the ADS. Furthermore, the control circuitry is configured select a path, from the local candidate path and the supplementary candidate path based on at least one constraint, for execution by the ADS, and to generate, at an output, a signal indicative of the selected path for execution. With this aspect of the invention, similar advantages and preferred features are present as in the previously discussed first aspect of the invention.

Still further in accordance with another aspect of the present invention there is provided a ground vehicle comprising at least one sensor configured to monitor a surrounding environment of the vehicle, at least one communication device for transmitting/receiving wireless signals to/from a remote system via a communication network, and an in-vehicle system according to any one of the embodiments disclosed herein.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
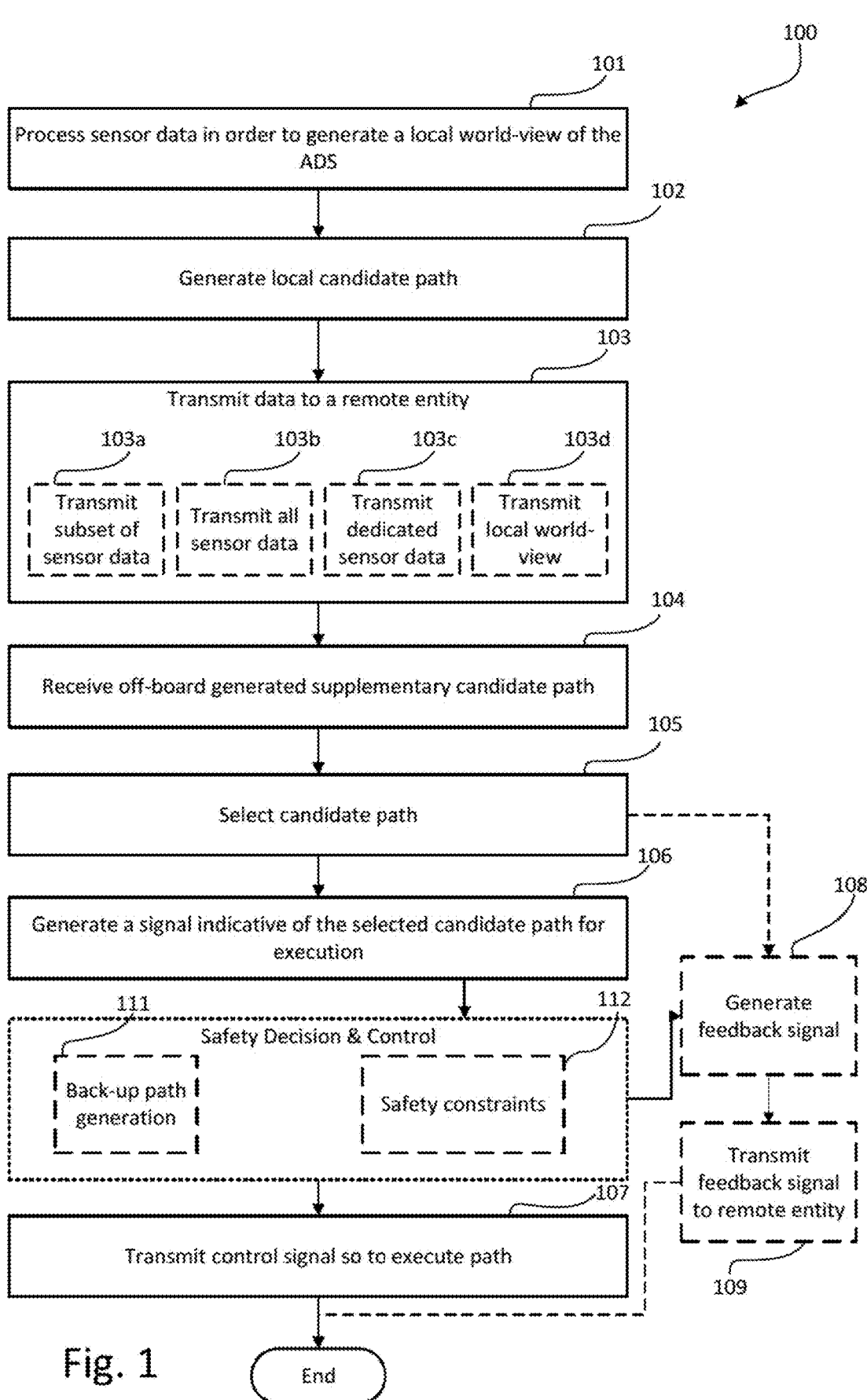
FIG. 1 is a schematic flow chart of a method for augmenting capabilities of an Automated Driving System (ADS) of a vehicle in accordance with some embodiments.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

To control an ADS in a safe way it is, for a relatively large amount of scenarios or cases, sufficient to obtain the output from the perception system within the order of hundreds of milliseconds or even seconds. This is however based on the assumption that most safety related actions are and will be done through precautionary algorithms, and not quick emergency actions. This acceptable "delay" opens up for the opportunity to conduct some, or perhaps even rather large parts, of the processing in a cloud service/system, as proposed in at least some of the embodiments disclosed herein. The processing that may be performed by the cloud service includes real-time perception, Decision and Control, as well as supervision of these.

Moving to cloud processing for real-time control has several technical advantages related to the increased flexibility that is achieved when the algorithms and models used for e.g. real-time perception, Decision and Control, and/or supervision, are decoupled from the on-board platform. Some of these potential technical advantages are:

Extended capabilities beyond deployed on-board hardware (HW) platform. Moreover, the addition of new functionality or updates to the software may be rolled out more efficiently.

Added functionalities based on machine learning are no longer limited to the on-board processing hardware.

Possibility to handle more complex or advanced optimization problems (e.g. solving path planning problems taking into account a higher number of factors than previously possible).

Restrictions related to the amount of training data that can be used due to potential saturation of machine learning networks may be reduced or even completely lifted.

The added functionality provided by the cloud service may be used both for Quality Management (QM) comfort control actions, as well as precautionary safety to determine safe actions in new situations, or to set more/less conservative margins of in-vehicle limits. Thus, both the user-perceived comfort as well as the general safety of the ADS may be increased.

It should be noted that for certain safety aspects (emergency actions and other actions that require quicker response times) in which time delay is critical, e.g. less than 10 ms, it is necessary to keep the safety related perception processing, decision and control processing in the car. In more detail, the ADS is configured such that a delay in the communication with the remote system doesn't jeopardize the safety of the system. Thus, if the response time from the remote system is too long (above a threshold), the on-board processing will always be able to handle safety-critical actions without awaiting the input from the remote system. Naturally, the on-board processing will be capable of handling unexpected events on "short notice", i.e. the on-board safety control does not need to wait for a response time to be exceeded in order to perform a safety critical manoeuvre. In other words, the on-board system of the ADS shall always be able to perform safely on its own in cases when the connection to the off-board platform (i.e. remote system) is unavailable.

FIG. 1 is a schematic flow chart representation of a method 100 for augmenting capabilities of an ADS of a vehicle in accordance with some embodiments. A vehicle is in the presented context to be understood as a ground vehicle or road vehicle such as e.g. a car, a bus, a truck, and so forth. The term augmenting may in the present context be understood as increasing, making greater, making larger, extending, enhancing, or similar. The method 100 comprises locally processing 101, by means of a perception module of the ADS, sensor data obtained from one or more sensors of the vehicle in order to generate a local world-view of the ADS. The sensor data is associated with a time period and comprises information about the surrounding environment of the vehicle during the time period. The sensor data may for example include data generated by any suitable vehicle-mounted sensor such as radar devices, camera devices, LIDAR devices, ultrasonic devices, and so forth. The "world-view" of the ADS may be understood as the perceived reality, model of the perceived reality, or a data representation of the surroundings of the ADS using sensor data, map data, etc.

The method 100 further comprises generating 102 a local candidate path to be executed by the ADS based on the generated local world-view of the ADS. In short, a general path planning system generates a candidate path (may also be referred to as a target path) for the autonomous vehicle from a given drivable area that is typically provided by a perception system or module (i.e. from the world-view). The candidate path is subsequently served as input to control module of the ADS that computes steering angles and such that the vehicle follows the path. In more detail, the path generation 102 may involve solving an optimization problem under a set of comfort constraints (i.e. Quality Management, QM, considerations).

Further, the method 100 comprises transmitting 103 a first set of data to a remote system (such as e.g. a cloud processing service). The first set of data is associated with the (same) time period and comprises information about the surrounding environment of the vehicle during the time period. Thus, the data used for generating the local world-view and the transmitted 103 sensor data originate from the same time period (i.e. have the same time stamps). This is in order to elucidate that the local perception module and the remote system processes information in the same temporal context, and to highlight the fact that remote and local processing are more or less concurrent processes.

The transmitted 103 first set of data may comprise transmitting only a subset 103a of the sensor data used for the local processing, transmitting 103b all of the sensor data used for the local processing, transmitting 103c dedicated sensor data (i.e. sensor data from one or more sensors solely dedicated to generate output for remote processing), or transmitting 103d the locally processed 101 data to the remote system. These various alternative transmissions 103a-103d are elaborated upon in the following.

Thus, in accordance with some embodiments, the step of transmitting 103 sensor data comprises transmitting 103a a subset of the sensor data obtained from the one or more sensor of the vehicle such that the supplementary world-view is based on a subset of the sensor data used for the local processing. In more detail, not all sensor data is necessarily processed by the remote system. In some cases, it might be suitable that only a subset of all the sensor data be processed off-board. For example, the image (or possibly stream of images) from one camera could be sent to the remote system whereas the rest of the sensor data (from multiple cameras, radar device(s), LIDAR device(s), etc.) is still locally processed 101 on-board by the perception module/system of the ADS.

Further, in some embodiments, the sensor data used for the local processing 101 comprises a first data stream from the one or more sensors of the vehicle, where the first data stream has a first sample rate. Moreover, the transmitted 103 sensor data then comprises a second data stream from the one or more sensors, where the second data stream has a second sample rate lower than the first sample rate. For example, the sensor data used for the local processing 101 may comprise a first image stream (having a first frame rate) from a camera device of the vehicle, while the transmitted 103 sensor data comprises a second image stream (having a second frame rate) from the camera device. In this case, the second frame rate is lower than the first frame rate. In other words, that the transmitted sensor data may in some embodiments include only every N'th image (N>=2) of the video stream used by the on-board (i.e. local) processing system. It should be noted that other types of sensor data (e.g. LIDAR output, radar output) may be used in an analogous manner.

Since the remote system may be configured with more advanced and sophisticated algorithms with more processing power, it may not be necessary to transmit 103 all of the sensor data generated on-board the vehicle in order to obtain an adequate output from the remote system. In other words, the remote system may be capable of generating high quality perception output with only a fraction of the sensor data used by the on-board perception module, thereby saving bandwidth while still having the advantages provided by the supplementary world-view.

In accordance with some embodiments, the transmitted 103 sensor data is from one or more sensors of the vehicle configured to only collect data for transmission 103c to the remote system such that the remotely generated supplementary world-view is based on a different set of sensor data than the locally generated world-view. In more detail, it is envisioned that vehicles may be produced and equipped with a higher number of sensors or more sophisticated sensors capable of outputting more data than the on-board perception system can process (e.g. due to limitations in the hardware resources). The reason for this may either be to increase redundancy or to facilitate future hardware/software upgrades on the on-board perception processing platform. Accordingly, by means of the herein disclosed solution, such sensors, that currently are not utilized or at least not to their full extent, may be repurposed and better utilized by transmitting their output to the remote system. Moreover, in some cases, using sensor data from a "dedicated sensor", retrofitting of existing vehicle platforms may be facilitated, for example by addition of new sensors solely for the purpose of providing remote processing capability.

In more detail, with the knowledge of remote processing (e.g. cloud processing) being available, one may add additional sensors or re-purpose existing sensors, whose output would not be possible to accommodate within the on-board processing platform. These sensors may accordingly be configured to directly stream its data to the remote system, which is configured to return useful output in a timely manner. In accordance with an illustrative example, the ADS may comprise a Traffic Jam Pilot (TJP) feature without the possibility of doing lane changes wherefore the vehicle does not have rear and side-facing LIDAR devices. However, as a development of this TJP feature, one may wish to add the capability of doing lane changes, which would require the rear and side-facing LIDAR devices.

However, the compute platform of the on-board system may not even be able to handle the addition of further data output such as the sensor output from these LIDAR devices and still be able to process the output from all of the original sensors. Accordingly, as a solution one may choose to send the image stream from one or several of the cameras to the remote system for processing and thereby free up resources in the on-board platform. In such a way, it may be possible to retrofit the platform with new sensors without necessarily warranting a hardware upgrade of the computational resources on-board platform. Thereby readily providing advantages in terms of cost-effective "retrofitting" for new functionality, improved system flexibility, and prolonged lifetime of the on-board hardware platform.

Further, in some embodiments, the locally processed 101 data is sent to the remote system. In other words, the method 100 may further comprise transmitting 103d one or more of object-level data originating from at least one sensor of the vehicle, fused object-level data from a plurality of data sources the generated local world-view of the ADS to the remote system.

Still further, the method 100 further comprises receiving 104 off-board processed data from the remote system, where the off-board processed data is indicative of a supplementary candidate path to be executed by the ADS. In more detail, the remote system (e.g. cloud service) processes the transmitted 103 sensor data in order to generate one or more supplementary candidate paths through more complex and sophisticated path planning algorithms as the remote system is not bound to the same processing hardware and power supply restrictions as the on-board platform. Thus, the supplementary candidate path is generated based on a more complete understanding of the surroundings of the vehicle, and with more capable algorithms and models.

Further, the method 100 comprises selecting 105 a path, from the local candidate path and the supplementary candidate path based on at least one constraint, for execution by the ADS. The at least one constraint may for example be a set of comfort criteria (e.g. acceleration thresholds and jerk threshold for the associated trajectory) and/or a set of constraints imposed by the vehicle platform (maximum acceleration/deceleration, maximum steering torque, turning radius, vehicle dimensions, etc.). Once, a path has been selected 105, the method further comprises generating 106, at an output, a signal indicated of the selected 105 path for execution. The selection 105 may for example be understood as a selection under Quality Management (QM) considerations, where QM refers to the 15026262 standard's consideration that it is below ASIL A in which there is no safety relevance, and only standard QM processes are required to fulfil any relevant requirements. Moreover, in some embodiments, the method 100 further comprises executing the selected path.

To allow for continuous improvement of the remote system platform (e.g. cloud platform) it is further suggested that the on-board system provides feedback as to if the remotely supplied candidate path was used in the final path selection 105. Examples of why it might not have been selected range from too large latency of the response from the remote system (rendering the information obsolete) to it being determined/judged not sufficiently useful.

Accordingly, in some embodiments, the method 100 further comprises generating 108 at an output, a first feedback signal for transmission 109 to the remote system, where the first feedback signal is indicative of the selected candidate path. Accordingly, the method 100 may further comprise transmitting 109 the generated 108 feedback signal to the remote entity. In other words, a path-feedback signal is transmitted 109 back to the remote system for learning purposes. The path feedback signal is, as mentioned, indicative of the selected path, and if the remotely generated path was rejected, the feedback signal may further be indicative of one or more rationales or reasons as to why the remotely generated path was rejected (e.g. too large latency, violation of one or more safety criteria, violation of other criteria, etc.).

There are multiple parts of an ADS that are restrained by the platform (hardware and available power supply) of the on-board system. This means that a lot of effort is spent on developing algorithms that solve the problem related to driving and scene understanding given these hardware restrictions. Modern machine learning algorithms are fairly capable for inference (e.g. classifying an image), but real-time capability is limited by the available computational resources. Since the platform on-board an ADS is limited in computational resources, the complexity of the algorithms (e.g. size of the neural networks) are also limited in the trade-off between available resources and the requirements to provide output in real-time. As more data becomes available for algorithm development, it is of course possible to develop even more capable algorithms/models. However, since the HW platform of the ADS will be set, it may in general be practically impossible to increase the computational capacity on-board. New algorithm developments, such as new path planning algorithms, might thus be infeasible to deploy on-board vehicles due to computational restrictions.

In more detail, neural network design and size are limited by the platform they are deployed on. This means that when such models are deployed in a car with a fixed hardware platform there will be limitations in how complex the networks can be. In addition and in reference to the "re-configurability/adoptability" aspect to accommodate/make use of new findings/advances in the field of neural networks/machine learning in general, it is probably impossible to make the necessary adjustments on a "fixed" hardware platform. Moreover, there is a limit on what a neural network of a given size can learn before it saturates, i.e. cannot learn any more. For such a limited neural network there is an additional challenge in selecting a set of appropriate training data that is relevant for the network to handle, without saturating it.

Thus, if one realizes, at a later stage, that the initial training data was insufficient, and that a more complex network is needed in order to handle an extended training data set, the hardware platform limitations may make it infeasible to deploy the required models. However, if the network inference task is instead performed on data (e.g. images) sent to a separate, more powerful and extendable compute platform, i.e. to a remote system such as e.g. a cloud service, the on-board hardware limitations may be circumvented for many tasks, allowing for a much higher fidelity and complexity in the deployed models and algorithms. An additional advantage of having for ADS software (such as e.g. path planning or perception processing) deployed centrally on a "cloud platform" is that decisions and planning based on interactions between multiple vehicles may be performed without having to transfer data between individual vehicles.

Further, modern communication networks allow for sufficiently low latency for many data transfer problems that require near real-time response times. With the large scale 5G roll-out expected in the coming years, it can also be assumed that high bandwidth, low-latency data transfer and communication tasks will be even easier to develop and deploy over time. Thus, the present inventors realized that conventional notions and assumptions that all of the software processing of an ADS must be performed locally on-board the vehicle may be invalid. Accordingly, it was realized that many of the quality decisions, as well as precautionary safety decisions, in a vehicle may be performed centrally (e.g. by a cloud service) and then transferred to the ADS without any noticeable negative impact in function performance or user experience.

Accordingly, the present invention proposes to use a remote system, such as a cloud platform, to augment the capabilities of the ADS in order to improve the path planning process. Moreover, the same concept may be extended in order to improve other ADS tasks such as perception system output and driving policy control in accordance with some embodiments.

Further, in some embodiments, the method 100 further comprises generating 111 a back-up path based on the local world-view of the ADS, and evaluating the selected 105 path against a set of safety constraints 112 (e.g. distance to external objects, distance to road edge, etc.). Then, if the selected 105 path for execution fulfils the set of predefined safety constraints 112, a first control signal is transmitted 107 so to execute the selected 105 path. However, if the selected path for execution fails to fulfil the set of predefined safety constraints 112, the method 100 comprises transmitting a second control signal so to execute the generated 111 back-up path. Moreover, the method may further comprise generating 108 a second feedback signal to the remote system, where the second feedback signal is indicative of the comparison of the selected path for execution against the set of predefined safety constraints 112.

Accordingly, the path arbitration or path selection process is two-fold, where the first selection process is based on QM considerations, while the second selection process is controlled by an on-board safety monitoring module, which is configured to make sure that the ADS is always provided with a "safe path" or "back-up path" option. Thus, in accordance with some embodiments, the process flow for remote path planning may be as follows:

Real-time sensor data is streamed to the remote system with time stamps.

Cloud processing is conducted on the sensor data stream through a cloud architecture that outputs a suggested path.

An arbitration module selects the locally generated path or the remotely generated path (assuming that both are available and concurrent).

Feedback on the validity of the paths is sent back to the remote system for learning purposes.

Safety Decision and Control (D&C) algorithms approves the path/control commands or choses a safe path.

Feedback on acceptance of supplementary candidate path is sent back to the remote system for learning purposes.

Executable instructions for performing these functions are, optionally, included in a non-transitory computer-readable storage medium or other computer program product configured for execution by one or more processors.

Figure 2:
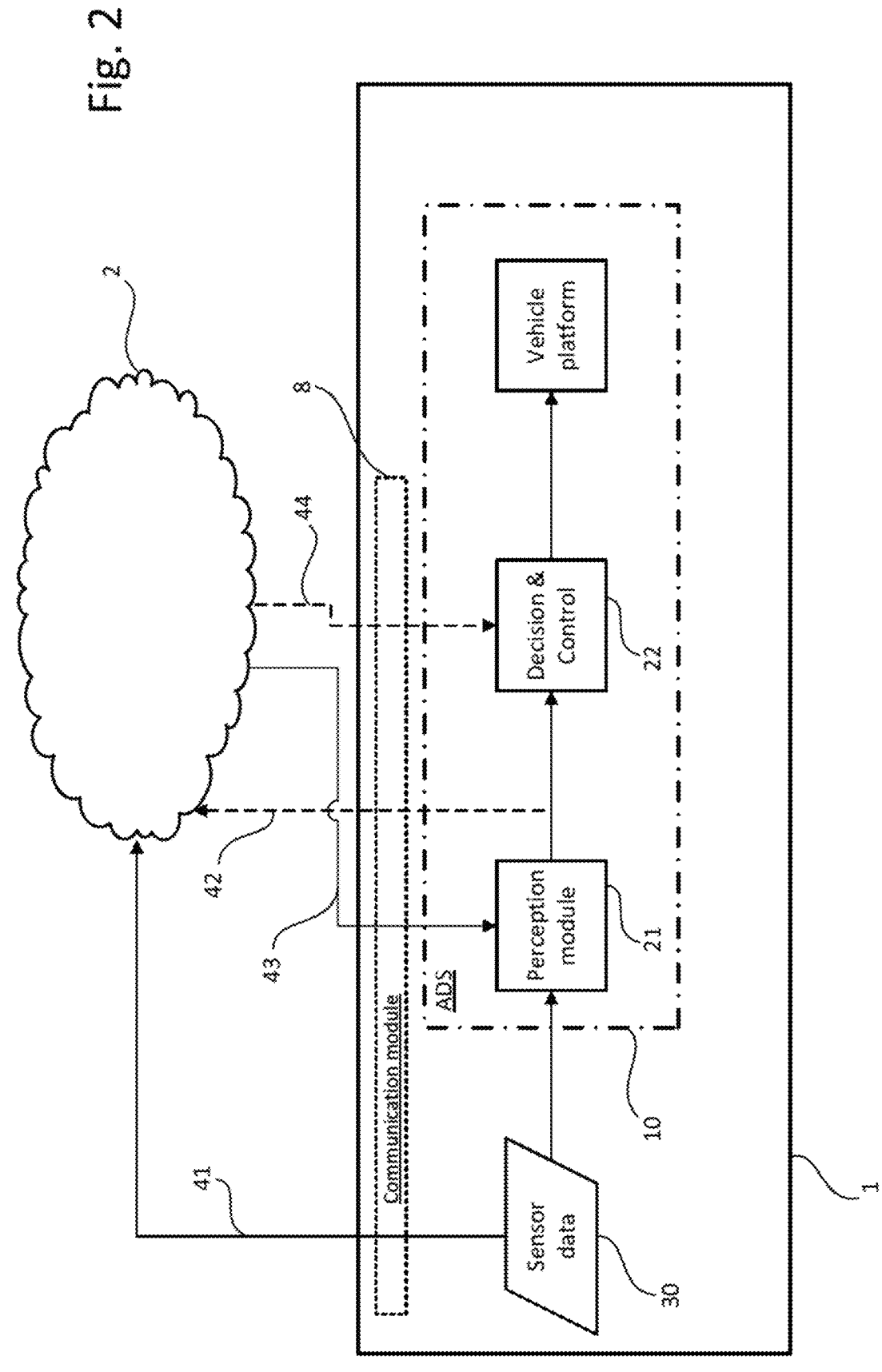
FIG. 2 is a schematic block diagram of an in-vehicle system for augmenting capabilities of an Automated Driving System (ADS) of a vehicle in accordance with some embodiments.

FIG. 2 is a schematic block diagram representation of an in-vehicle system 10 for augmenting capabilities of an Automated Driving System (ADS) of a vehicle 1 in accordance with some embodiments of the invention. In the illustrated embodiment, the in-vehicle system 10 is illustrated as a part of the ADS, but as the skilled reader readily understands, the in-vehicle system 10 may be provided as a separate/parallel entity depending on platform specifications or specific applications.

In more detail, FIG. 2 shows an overview of an example embodiment of the herein proposed system and its possible uses. The on-board system of the ADS (enclosed in the broken-line box 10) transmits data 41, 42 to the remote system 2, which processes and sends back the results 43, 44 to the on-board system 10. In some embodiments, the sensor data 30 from the vehicle 1 is transmitted to the remote system 2. In some embodiments, the transmitted data contains the perception system output 42, such as free-space, object level data, etc. Moreover, in some embodiments, the returned, remotely processed, data contains a suggested path 44 for the ADS to execute. However, these various embodiments related to remote path planning, augmented perception, and remote driving policy control will be further elucidated in reference to FIG. 3, FIG. 4, and FIG. 5 respectively. It should be noted that any of these depicted routes 41, 42, 43, 44 may be combined with each other in various ways and may run in parallel with each other. The in-vehicle system 10 comprises control circuitry configured to one or more programs stored in a computer-readable storage medium for performing the method according to any one of the embodiments disclosed herein.

Figure 3:
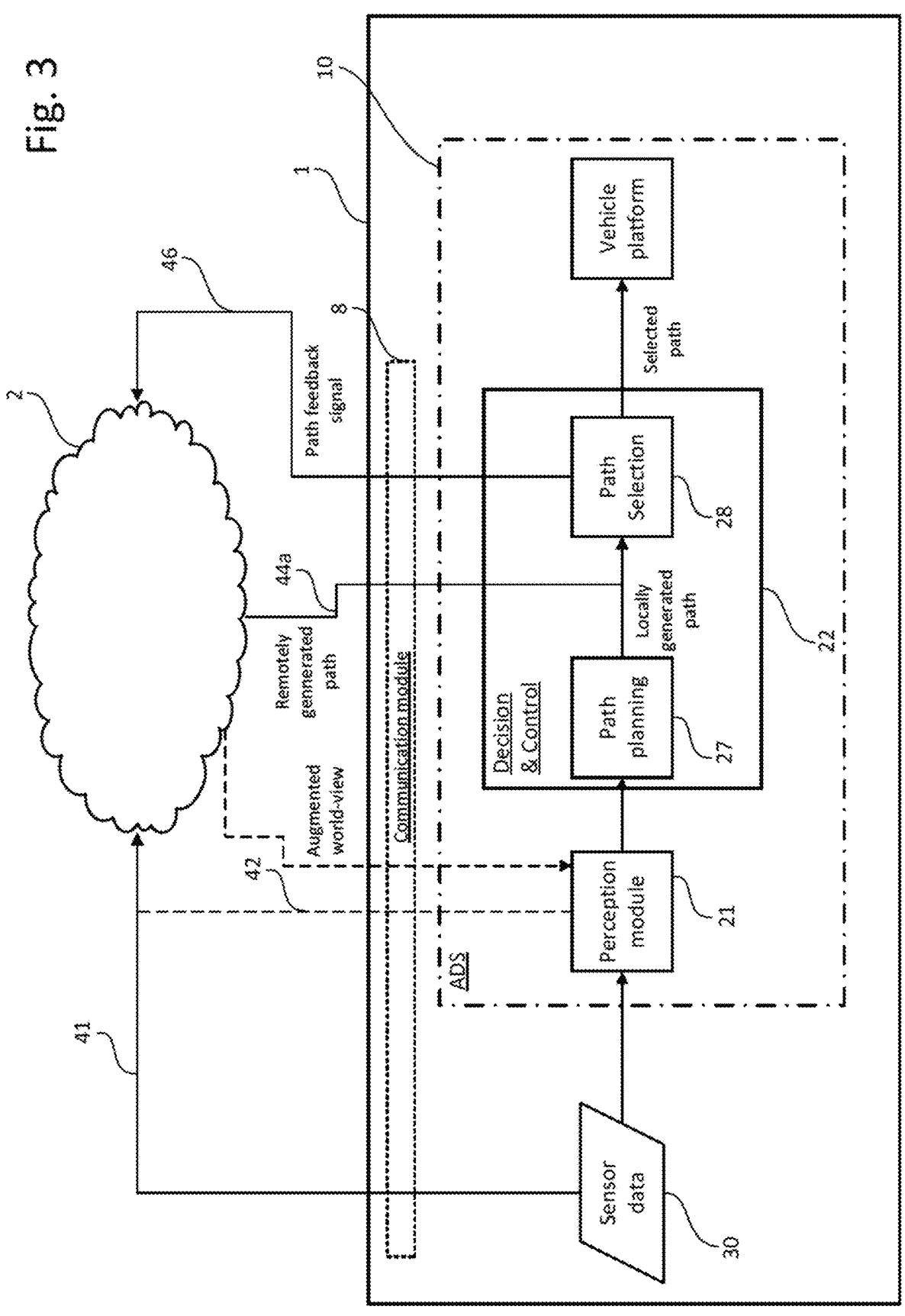
FIG. 3 is a schematic block diagram of an in-vehicle system for augmenting capabilities of an Automated Driving System (ADS) of a vehicle in accordance with some embodiments.

FIG. 3 is a schematic block diagram representation of an in-vehicle system 10 for augmenting capabilities of an ADS of a vehicle 1 in accordance with some embodiments. Here, all of the sensor data 30 may be transmitted to the remote system 2 (as indicated by arrow/connector 41) in order to let the remote system 2 determine a suggested path (candidate path) 44*a* for the ADS to execute. In some embodiments however, the output 42 from the perception module 21 (e.g. object-level data) is transmitted to the remote system 2 in addition to or as an alternative for the sensor data 30.

In other words, sensor data 30 is transmitted to the off-board platform 2 for processing and the new augmented data 44*a* is transmitted back to the ADS. Sensor data 30 may for example be raw sensor data e.g. in the form of raw images that are classified in a cloud network 2 and further processed by the cloud network 2. The output 44*a* from the cloud network 2 is then sent back and received by the vehicle's 1 ADS. The output 44*a* from the remote system 2 may for instance be used to set the decision and control safety driving policy (e.g. detection of certain objects), or as input to path planning, which is then checked by the on-board decision and control safety monitoring algorithms. The setting of a driving policy via the remote system 2 is further elaborated upon in reference to FIG. 5.

Moving on, the control circuitry is configured to locally process, by means of a perception module 21 sensor data 30 obtained from one or more sensors of the vehicle 1 in order to generate a local world-view of the ADS. The sensor data accordingly comprises information about a surrounding environment of the vehicle and may be in the form of an image stream, radar detections, LIDAR detections, and so forth. A perception system/module 21 is in the present context to be understood as a system responsible for acquiring raw sensor data 30 from on-board sensors such as cameras, LIDARs, radars, and ultrasonic sensors, and converting this raw data into scene understanding.

Further, the control circuitry is configured to generate a local candidate path to be executed by the ADS based on the generated local world-view. In other words, a candidate path is locally generated by a path planning module 27 of the in-vehicle system based on the local perception output. The control circuitry is further configured to transmit sensor data 30 (as indicated by the arrow/connector 41), where the sensor data 30 comprises information about the surrounding environment of the vehicle to a remote system (such as e.g. a cloud service) 2. The control circuitry 11 is further configured to obtain the off-board processed data from the remote system 2, where the obtained off-board process data is indicative of a supplementary candidate path 44 to be executed by the ADS. However, in some embodiments, the off-board processed data is indicative of a supplementary world-view 43 of the ADS. However, the embodiments related to the supplementary world-view and the formed augmented world-view are further elaborated upon in reference to FIG. 4.

Further, the control circuitry is configured to select (e.g. by means of a path selection algorithm/module 28) one candidate path for execution by the ADS based on the locally generated candidate path, the remotely generated candidate path, and at least one predefined criterion. The at least one predefined criterion may for example be a set of comfort criteria (e.g. acceleration thresholds and jerk threshold for the associated trajectory), and/or a set of constraints imposed by the vehicle platform (maximum acceleration/deceleration, maximum steering torque, turning radius, vehicle dimensions, etc.). Further, the control circuitry is configured to generate, at an output, a path signal indicative of the selected candidate path. In some embodiments, the control circuitry is further configured to execute the selected path.

Moreover, in some embodiments, a path-feedback signal 46 is transmitted back to the remote system for learning purposes. The path feedback signal 46 may for example be indicative of the selected path, and if the remotely generated path 46 was rejected, one or more rationales or reasons as to why the remotely generated path 46 was rejected (e.g. too large latency, violation of one or more safety criteria, violation of other criteria, etc.).

Accordingly, in some embodiments, the received off-board processed data is evaluated/compared against a latency threshold, and the selection of the path from the local candidate path and the supplementary candidate path is only performed if the received off-board processed data doesn't exceed the latency threshold. Thus, if the off-board processed data 44*a* exceeds a latency threshold, that data may be deemed invalid and therefore discarded prior to the selection process.

Furthermore, an example of an extended functionality that may be provided by the remote system 2 in terms of path planning is recognition of emergency vehicles approaching from behind in the transmitted sensor data 30, wherefore the supplementary candidate path may account for such scenarios. In more detail, the supplementary candidate path may include moving the vehicle to the side of the road to allow an approaching emergency vehicle to pass in traffic jam situations. Similarly, the remote path planning may allow for low speed navigation through road work scenarios, which is a feature that may be unavailable on the on-board platform due to restrictions in computational resources.

Figure 4:
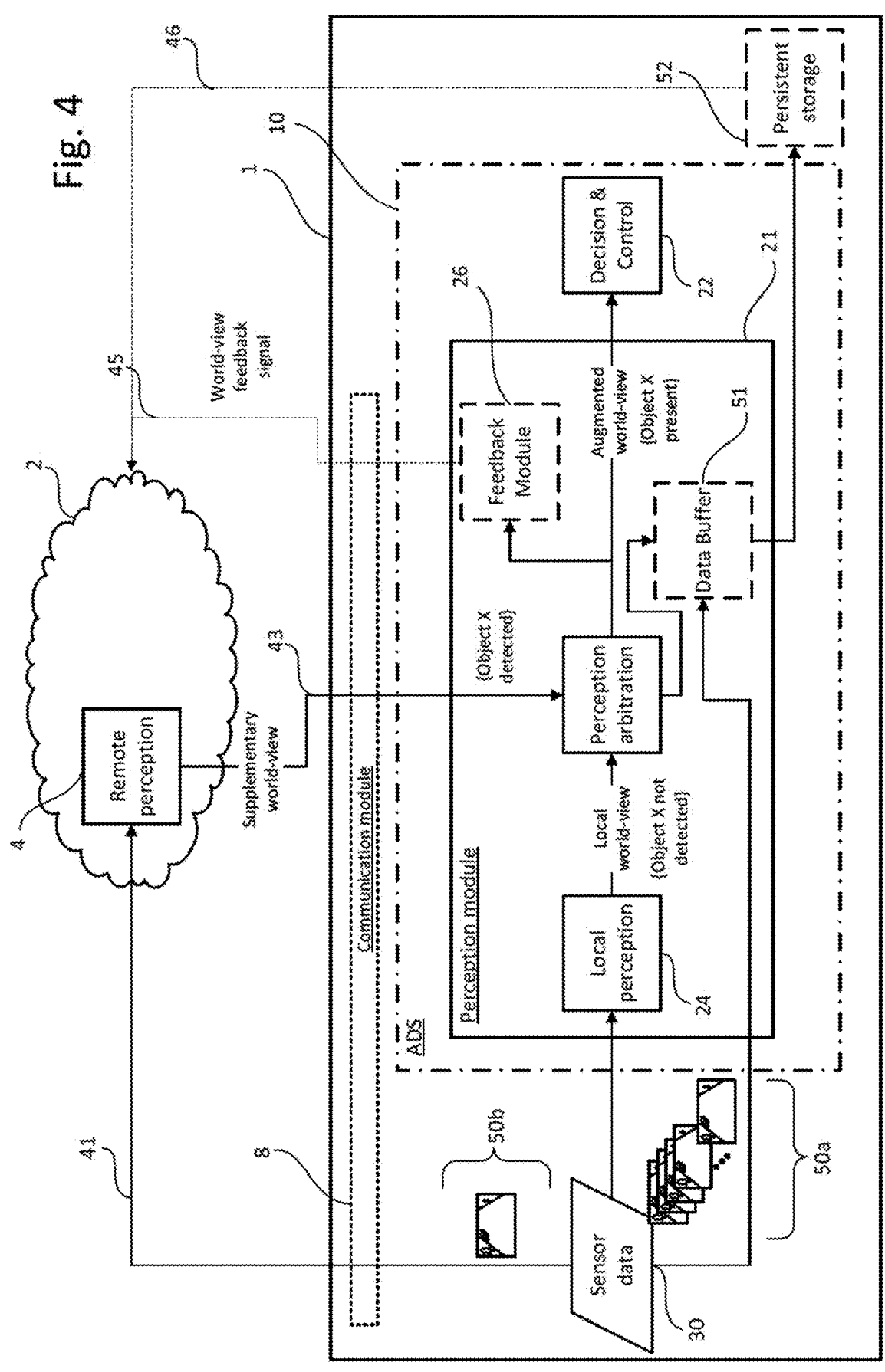
FIG. 4 is a schematic block diagram of an in-vehicle system for augmenting capabilities of an Automated Driving System (ADS) of a vehicle in accordance with some embodiments.

FIG. 4 is a schematic block diagram representation of an in-vehicle system 10 for augmenting capabilities of an ADS of a vehicle 1 in accordance with some embodiments of the invention. As depicted in FIG. 4, the remote system 2 is used to augment the perception data of the on-board system 10. The sensor output 30 is transmitted to the remote system 2, which returns the results 43 from processing this data 30 through potentially more complex and sophisticated algorithms on more capable hardware 4 as compared to the on-board hardware 21. The off-board processed data 43 is then incorporated in either the input to, or output from, the on-board perception block 24.

Moreover, in some embodiments, the augmented world-view (i.e. the combined local world-view and the supplementary world-view) may be utilized by the local path planning module 27 to generate the local candidate path, as indicated in FIG. 3.

Further, the remote system 2 may be utilized to extend the object detection/classification capabilities of the on-board perception block 24. In accordance with an illustrative example, the sensor data 30 comprises a video feed 50*a* from a camera. The video feed (e.g. having a frame rate of 40 Hz) is provided as input to the local perception module 21, where it is processed through an object detection and classification algorithm in order to generate a local world-view. At the same time, a subset of images from the video feed (e.g. at a frame rate of 1 Hz) is transmitted to the remote system, where it is processed through a more capable object detection and classification algorithm 4 and an output in the form of a supplementary world-view 43 is generated and sent back to the vehicle 1. It should be noted that other algorithms configured to fulfil a set of perception objectives are equally feasible.

The off-board processed data 43 may for example be object-level data comprising data indicative of a pose of detected and classified objects or information related to other perceivable aspects (such as e.g. free-space, environmental parameters, road surface parameters, signage semantics, etc.) in the surrounding environment of the vehicle 1.

For example, an object detection and classification algorithm of the on-board perception block 24 may not be capable of detecting specific traffic signs, or to differentiate between different types of vehicles. However, an off-board object detection and classification algorithm may be more capable, wherefore the resulting augmented world-view will be indicative of an extended object detection and classification capability, and the ADS will be provided with a better "understanding" of the surrounding environment of the vehicle.

Moreover, in some embodiments, the remote system 2 may be used to reduce uncertainty in the local perception output. In more detail, the local perception module 21 may for example not be able to detect or classify one or more objects/scenarios in the surrounding environment, or at least not to a sufficient confidence level. For example, the vehicle 1 might be approaching roadworks, but the in-vehicle network may only be able to establish that the vehicle is approaching roadworks with a 10% confidence level, which is presumably below a threshold to be accepted as true. However, the supplementary world-view does however contain a detection of roadworks ahead, with a 90% confidence level. Thus, the object that was not detectable by the on-board perception block may still be accounted for in the augmented world-view that is supplied to the decision and control block 22 of the ADS. Thus, the probability of the ADS acting on false negatives in the perception output is reduced. This not only extends the functionality of the on-board perception block 21, but also renders in a more capable ADS, thereby increasing overall road safety.

An analogous example, with a false positive, would be that the local world-view is indicating that the vehicle is approaching roadworks with e.g. a 15% confidence level, wherefore the ADS is to be deactivated (after hand-over) as it is not configured to operate autonomously in such a scenario. However, the supplementary world-view indicates that the vehicle is not approaching any roadworks, wherefore the ADS is allowed to stay operational and in control of the vehicle platform. Thus, similar advantages in terms of extended functionality are applicable for the "false positive" case.

Further, it may be advantageous to identify those scenarios where there is a discrepancy between the local world-view and the supplementary world-view so that the associated data can be used for subsequent offline analysis, training of networks, etc. Going along with the above scenario, where a perception objective (i.e. detection of roadworks) was fulfilled in the supplementary world-view and the same perception objective was not fulfilled in the local world-view, i.e. a discrepancy between the local world-view and the supplementary world-view occurred.

Thus, in some embodiments, the control circuitry of the in-vehicle system 10 is configured to locally process, by means of the perception module 21 of the ADS, the sensor data from the one or more sensors of the vehicle by employing an algorithm configured to fulfil a set of perception objectives in the local world-view of the ADS. The algorithm may in some embodiments be a detection algorithm configured to detect a predefined perceivable aspect, or a detection and classification algorithm configured to detect and classify the predefined perceivable aspect. Moreover, the predefined perceivable aspect comprises at least one of a set of predefined objects, a set of locations of free-space area, a set of conditions of the surrounding environment.

Further, the control circuitry is configured to compare the local world-view of the ADS from a specific time period with the supplementary world-view 43, of the ADS from the specific time period so to identify a discrepancy. The discrepancy is defined by a situation where the set of perception objectives are fulfilled in the supplementary world-view 43 while the set of perception objectives are not fulfilled in the local world-view of the ADS. In the illustrated embodiment, an "Object X" was detected in the transmitted sensor data 50*b* (with a timestamp T1) by the remote system 2, while the locally processed sensor data 50*a* does not comprise a sufficiently confident indication of "Object X" based on the sensor data being associated with the corresponding time stamp T1.

Further, the control circuitry is configured to temporarily store the sensor data 30 in a data buffer, the data buffer 51 having a buffer length in the range of 1 second to 300 seconds (e.g. seconds, 30 seconds, 60 seconds, etc.). Accordingly, if the comparison is indicative of the discrepancy, the control circuitry is configured to transfer sensor data from the data buffer 51, the transferred sensor data comprising sensor data from the specific time period. The specific time period may for example be a time-period around the time stamp T1 associated with the sensor data where the discrepancy was formed, such as e.g. 15 seconds before and 15 seconds after T1. This provides a possibility to collect all of the sensor data generated by the on-board vehicle sensors during a time period preceding and following the moment in time where the discrepancy was formed. Thereby, the whole scenario leading up to and following the discrepancy can be analysed and properly annotated for training. Moreover, the data buffer may be of different lengths for different data categories, e.g. the road estimation filters etc. may require a longer buffer to capture the whole scenario, while target tracking may only need 7 s.

Moreover, in some embodiments, the step of transferring sensor data comprises transferring sensor data from the data buffer to a persistent storage 52. The data stored in the persistent storage may subsequently be uploaded 46 for offline analysis and annotation at a suitable time (e.g. while the vehicle 1 is parked).

It is generally rather difficult to generate or at least collect high quality training data that can be used to train a neural network, and in particular where there is an immense amount of data to review, where a majority of data is irrelevant for training purposes. In more detail, it may be an unsurmountable amount of work to manually review all of the data that a vehicle generates over the course of a driving session, and to select the data that is suitable for the training of specific neural networks. Therefore, by clever use of the situations where discrepancies between the local and supplementary world-views are identified, it is possible to extract high quality training data for machine learning purposes.

As mentioned, in order to allow for continuous improvement of the remote system's perception stack 4, the in-vehicle system 10 may comprise a feedback module 26 configured to provide feedback 45 as to if the supplementary world-view was used in the augmented world-view. In more detail, the control circuitry of the in-vehicle system 10 may be configured to generate, at an output, a worldview-feedback signal 45 for transmission to the remote system 2, where the world-view feedback signal 45 is indicative of a level of incorporation of the off-board processed data 43 in the augmented world-view. Level of incorporation may in some embodiments be how much additional data was provided by the remote system 2 compared to on-board perception block 24, and/or how much of the supplied supplementary world-view 43 (both time instances and area) that was utilised in the augmented world-view.

Figure 5:
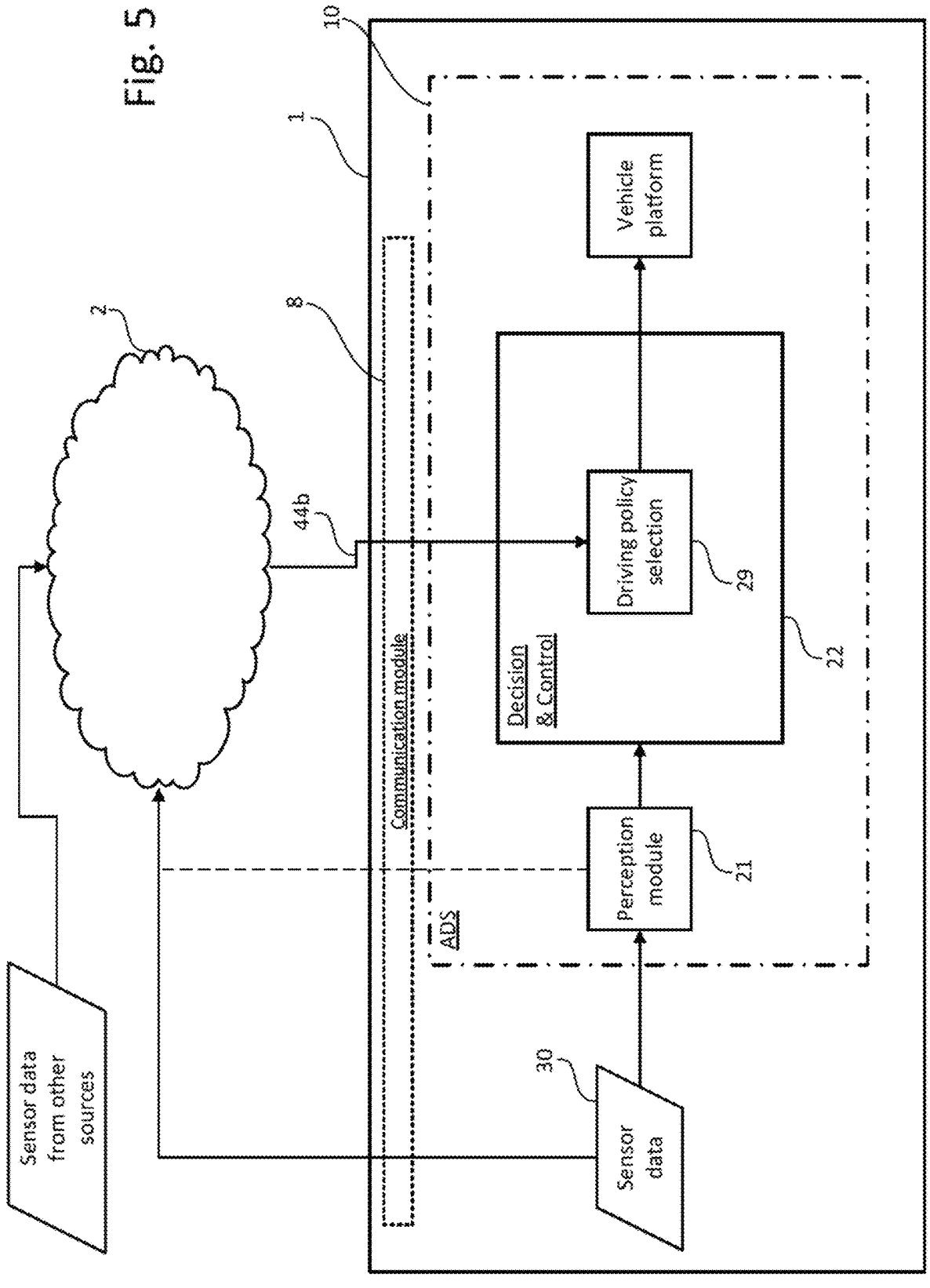
FIG. 5 is a schematic block diagram of an in-vehicle system for augmenting capabilities of an Automated Driving System (ADS) of a vehicle in accordance with some embodiments.

FIG. 5 is a schematic block diagram representation of an in-vehicle system 10 for augmenting capabilities of an ADS of a vehicle 1 in accordance with some embodiments. In more detail, FIG. 5 depicts how an off-board system (i.e. remote system) 2 can be used to supply input to the driving policy decision 29 of the ADS. The remote system 2 can make use of the sensor data 30 and/or perception data from the ADS to determine if there is an elevated risk exposure for the ADS at the moment. If that is the case, this may be communicated to the ADS to set it in a safer (more restrained) driving policy. The risk or risk exposure may be determined based on different measures of uncertainty of the output from the perception system of the ADS given the input sensor data, but also potentially by deploying more refined sensor models in the remote system 2 in order to determine the uncertainties of the sensor data itself.

Moreover, with restrictions to the on-board hardware the focus might be on supplying the critical functions for the operations of the ADS rather than optimising performance across all subsystems. Thus, by augmenting the system with cloud processing an advanced accurate algorithm requiring high power and processing power (presumably unavailable on-board) is utilised. The output 44b from this model can focus on intricate modelling of different risk factors of the ADS. By knowing these risk factors it may be possible to handle/navigate through in a safer manner with the on-board ADS hardware. Moreover, by identifying a higher granularity of the risk (enabled by the utilization of the remote system 2) it may be possible to also refine the driving policy to achieve closer to optimal performance.

Thus, in accordance with some embodiments, the control circuitry of the in-vehicle system 10 is configured to receive, from the remote system 2, a policy signal 44b indicative of a first driving policy out of a plurality of driving policies of the ADS, wherein each driving policy comprising a set of defined operating margins of the ADS. Accordingly, the control circuitry is further configured to set the driving policy of the ADS to (in accordance with) the first driving policy.

The transmission of a policy signal 44b may be construed as a way of informing the ADS of the surrounding in a different manner than sending the data to describe (i.e. transmitting the augmented world-view). The example with the driving policy is that it is relatively "data light" way, as it could essentially be an 4-bit unsigned INT being sent by the remote system 2 (to direct the ADS into which driving policy it should employ). Thus, in comparison with data of objects or descriptions of environmental conditions that needs much more "heavy data types", depending on fidelity, the driving policy signal 44b is a bandwidth efficient way of informing the ADS of its surrounding environment.

Figure 6:
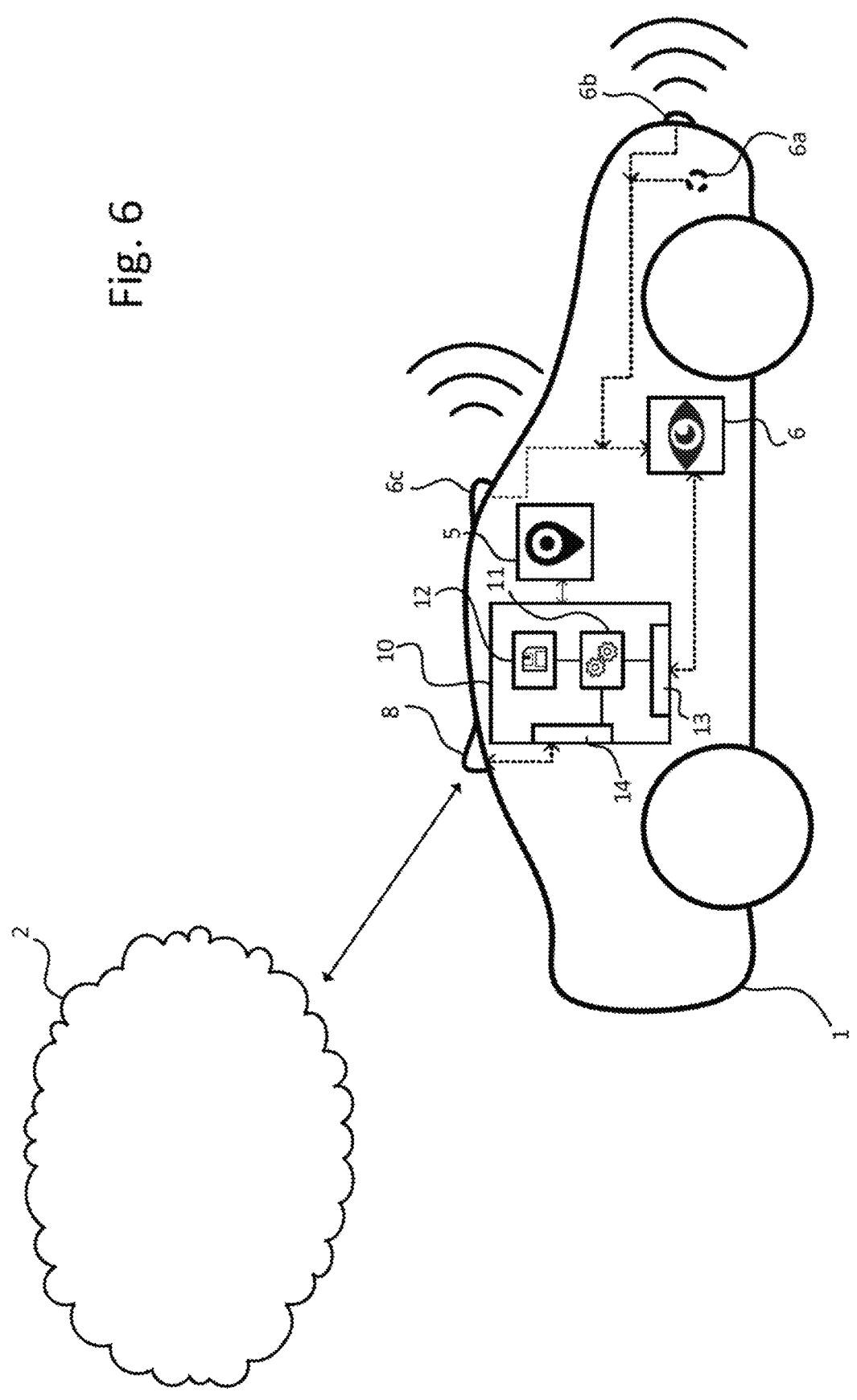
FIG. 6 is a schematic side view of a vehicle comprising an in-vehicle system for augmenting capabilities of an Automated Driving System (ADS) of a vehicle in accordance with some embodiments.

FIG. 6 is a schematic side view of a vehicle 1 comprising an in-vehicle system 10 for augmenting capabilities of an ADS of a vehicle 1 in accordance with some embodiments. The vehicle 1 further comprises a perception system 6 and a localization system 5. A perception system 6 is in the present context to be understood as a system responsible for acquiring raw sensor data from on sensors 6a, 6b, 6c such as cameras, LIDARs and radars, ultrasonic sensors, and converting this raw data into scene understanding. The localization system 5 is configured to monitor a geographical position and heading of the vehicle, and may be in the form of a Global Navigation Satellite System (GNSS), such as a GPS. However, the localization system may alternatively be realized as a Real Time Kinematics (RTK) GPS in order to improve accuracy.

The in-vehicle system 10 comprises one or more processors 11, a memory 12, a sensor interface 13 and a communication interface 14. The processor(s) 11 may also be referred to as a control circuit 11, control unit 11, controller 11, or control circuitry 11. The in-vehicle system 10 preferably comprises a number of software/hardware modules as described in the foregoing, here generalized as "control circuitry" 11. The control circuitry 11 is configured to execute instructions stored in the memory 12 to perform a method for augmenting capabilities of an ADS according to any one of the embodiments disclosed herein. Stated differently, the memory 12 of the in-vehicle system 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, control circuitry 11 is configured to locally process, by means of a perception module 6, sensor data obtained from one or more sensors 6a, 6b, 6c of the vehicle 1 in order to generate a local world-view of the ADS. The sensor data is associated with a time period and comprises information about a surrounding environment of the vehicle 1. A perception system/module 6 is in the present context to be understood as a system responsible for acquiring raw sensor data 30 from on-board sensors such as cameras, LIDARs radars, and ultrasonic sensors, and converting this raw data into scene understanding. The control circuitry 11 is further configured to generate a local candidate path to be executed by the ADS of the vehicle, based on the generated local world-view of the ADS.

Further, the control circuitry 11 is configured to transmit a first set of data to a remote system (such as e.g. a cloud service) 2. The transmitted first set of that is associated with the (same) time period and comprises information about the surrounding environment of the vehicle during that time period. The control circuitry 11 is further configured to obtain the off-board processed data from the remote system 2. The off-board processed data is in turn indicative of a supplementary candidate path to be executed by the ADS. Furthermore, the control circuitry 11 is configured to select a path, from the local candidate path and the supplementary candidate path based on at least one constraint, for execution by the ADS. Moreover, the control circuitry 11 is configured to generate, at an output, a signal indicative of selected path for execution. The vehicle 1 may be provided with suitable communication means 8 for transmitting and receiving signals via an external network.

Further, the vehicle 1 may be connected to external network(s) via for instance a wireless link (e.g. for retrieving map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to everything (V2X). Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the in-vehicle control system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry in the vehicle 1. The communication/antenna interface 14 may further provide the possibility to send output to a remote location (e.g. remote system) by means of the antenna 8. Moreover, some sensors 6a, 6b, 6c in the vehicle may communicate with the in-vehicle system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of locally processing sensor data and transmitting sensor data may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A computer-implemented method for augmenting capabilities of an Automated Driving System (ADS) of a vehicle, the method comprising:

locally processing, using a perception module of the ADS, sensor data obtained from one or more sensors of the vehicle in order to generate a local world-view of the ADS, wherein the sensor data is associated with a time period and comprises information about a surrounding environment of the vehicle during the time period;

generating a local candidate path to be executed by the ADS based on the generated local world-view of the ADS;

transmitting a first set of data to a remote system, the first set of data being associated with the time period and comprising information about the surrounding environment of the vehicle;

receiving off-board processed data from the remote system, the off-board processed data being indicative of a supplementary candidate path to be executed by the ADS;

selecting a path, from the local candidate path and the supplementary candidate path based on at least one constraint, for execution by the ADS;

generating, at an output, a signal indicative of the selected path for execution;

generating a back-up path based on the local world-view of the ADS;

evaluating the selected path for execution against a set of predefined safety constraints; and in response to the selected path for execution fulfilling the set of predefined safety constraint, transmitting a first control signal so to execute the selected path for execution; and in response to the selected path for execution failing to fulfil the set of predefined safety constraints, transmitting a second control signal so to execute the generated back-up path, and generating a second feedback signal to the remote system, wherein the second feedback signal is indicative of the comparison of the selected path for execution against the set of predefined safety constraints.

2. The method according to claim 1, wherein the transmitted first set of data comprises at least a subset of the sensor data obtained from one or more sensors of the vehicle.

3. The method according to claim 2, wherein the sensor data is raw sensor data.

4. The method according to claim 1, wherein the first set of data comprises the locally processed sensor data.

5. The method according to claim 4, wherein the first set of data comprises at least one of:

object-level data originating from at least one sensor of the vehicle;

fused object-level data from a plurality of data sources; or the local world-view of the ADS.

6. The method according to claim 1, further comprising:

generating, at an output, a first feedback signal for transmission to the remote system, wherein the first feedback signal is indicative of the selected candidate path.

7. The method according to claim 1, wherein the transmitting of the first set of data comprises streaming, in real-time, the first set of data to the remote system.

8. The method according to claim 1, wherein the first set of data is time-stamped.

9. The method according to claim 8, further comprising:

evaluating the received off-board processed data against a latency threshold; and wherein the selection of the path from the local candidate path and the supplementary candidate path is only performed if the received off-board processed data doesn't exceed the latency threshold.

10. The method according to claim 9, wherein evaluating the received off-board processed data against a latency threshold comprises:

evaluating time-stamps of the first set of data against the latency threshold in order to determine a validity of the supplementary candidate path.

11. The method according to claim 9, further comprising:

discarding the received off-board processed data if the received off-board processed data exceeds the latency threshold.

12. The method according to claim 1, wherein the off-board processed data is further indicative of a supplementary world-view of the ADS, the method further comprising:

forming an augmented world-view of the ADS based on the generated local world-view and the supplementary world-view; and generating, at an output, a signal indicative of the augmented world-view of the ADS.

13. A non-transitory computer-readable storage medium storing one or more programs configured to be executed by one or more processors of a vehicle control system, the one or more programs comprising instructions for performing the method according to claim 1.

14. An in-vehicle system for augmenting capabilities of an Automated Driving System (ADS) of a vehicle, the in-vehicle system comprising one or more processors and memory storing one or more programs configured to be executed by the one or more processors, the one or more programs comprising instructions for performing the method according to claim 1.

15. A ground vehicle comprising:

at least one sensor configured to monitor a surrounding environment of the vehicle;

at least one communication device for transmitting/receiving wireless signals to/from a remote system via a communication network; and an in-vehicle system according to claim 14.

* * * * *